(12) United States Patent
Klug et al.

(10) Patent No.: US 6,859,293 B2
(45) Date of Patent: Feb. 22, 2005

(54) ACTIVE DIGITAL HOLOGRAM DISPLAY

(75) Inventors: Michael A. Klug, Austin, TX (US); Craig Newswanger, Austin, TX (US); Qiang Huang, Austin, TX (US); Mark E. Holzbach, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 10/691,041

(22) Filed: Oct. 22, 2003

(65) Prior Publication Data

US 2004/0114204 A1 Jun. 17, 2004

Related U.S. Application Data

(60) Provisional application No. 60/420,170, filed on Oct. 22, 2002, and provisional application No. 60/442,305, filed on Jan. 24, 2003.

(51) Int. Cl.$^7$ .............................. G03H 1/04; G03H 1/26; G03H 1/30
(52) U.S. Cl. .............................. 359/4; 359/23; 359/25; 359/26; 359/35
(58) Field of Search .............................. 359/9, 23, 32, 359/35, 4, 5, 6, 7, 22, 25, 26

(56) References Cited

U.S. PATENT DOCUMENTS

| 3,542,452 A | * | 11/1970 | Gerritsen et al. ............... 359/4 |
| 3,761,154 A | * | 9/1973 | Shupe et al. .................... 359/4 |
| 4,710,899 A | | 12/1987 | Young et al. ............... 365/113 |
| 5,591,501 A | | 1/1997 | Ovshinsky et al. ........ 428/64.1 |
| 5,796,498 A | * | 8/1998 | French ............................ 359/4 |
| 6,211,848 B1 | | 4/2001 | Plesniak et al. ................ 345/1 |
| 6,281,994 B1 | * | 8/2001 | Horikoshi et al. ............ 359/32 |
| 6,322,932 B1 | | 11/2001 | Colvin et al. .................... 430/2 |
| 2002/0068223 A1 | | 6/2002 | Cetin et al. ..................... 430/1 |
| 2003/0152842 A1 | | 8/2003 | Cetin et al. ..................... 430/1 |

FOREIGN PATENT DOCUMENTS

| WO | WO 00/75698 A1 | 12/2000 |
| WO | WO 00/75699 A1 | 12/2000 |
| WO | WO 01/45943 A2 * | 6/2001 |

* cited by examiner

*Primary Examiner*—John Juba, Jr.
(74) *Attorney, Agent, or Firm*—Campbell Stephenson Ascolese LLP; Marc R. Ascolese (57) ABSTRACT

Certain types of holographic recording materials can be used to updateably record holographic stereograms formed when fringe patterns are generated through interference of an object laser beam containing image information with a reference laser beam. In this manner, calculation of fringe patterns is avoided, and instead perspective information is computed for a scene or object to be displayed, the information is downloaded to display hardware such as a spatial light modulator, and fringe patterns are subsequently generated through interference of an object laser beam containing this information with a reference laser beam in the classic hologram recording scheme. Previously recorded holographic stereograms or component hogels are updated by erasing the stereograms or component hogels and recording updated stereograms or component hogels, or by recording updated stereograms or component hogels in a separate portion of the holographic recording material.

25 Claims, 6 Drawing Sheets

ACTIVE DIGITAL HOLOGRAM DISPLAY

This application claims the benefit, under 35 U.S.C. § 119 (e), of U.S. Provisional Application No. 60/420,170, filed Oct. 22, 2002, entitled "Rapid-Update Holographic Display," and naming Michael A. Klug, Craig Newswanger, Qiang Huang, and Mark E. Holzbach as inventors; and of U.S. Provisional Application No. 60/442,305, filed Jan. 24, 2003, entitled "Rapid Panoramic Visualization of 3D Data," and naming Michael A. Klug, Craig Newswanger, Qiang Huang, and Mark E. Holzbach as inventors. The above-referenced applications are hereby incorporated by reference herein in their entirety.

BACKGROUND OF THE INVENTION

1. Field of the Invention

The present invention relates in general to the field of hologram production and, more particularly, to production of updateable holograms.

2. Description of the Related Art

One-step hologram (including holographic stereogram) production technology has been used to satisfactorily record holograms in holographic recording materials without the traditional step of creating preliminary holograms. Both computer image holograms and non-computer image holograms can be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is typically directed through a spatial light modulator (SLM) displaying a rendered image and then interfered with a reference beam. Examples of techniques for one-step hologram production can be found in the U.S. Pat. No. 6,330,088 entitled "Method and Apparatus for Recording One-Step, Full-Color, Full-Parallax, Holographic Stereograms," naming Michael A. Klug, Mark E. Holzbach, and Alejandro J. Ferdman as inventors, ("the '088 patent") which is hereby incorporated by reference herein in its entirety.

In general, the techniques described in the '088 patent and other prior art techniques do not provide for both hologram recording and display in real-time. Moreover, these techniques are not designed to produce active or quickly-updateable displays. There are significant applications for a display that is capable of producing autostereoscopic holographic three-dimensional images that are interactive and update-able in a reasonable amount of time (e.g., on the order of seconds or minutes). However, there are three significant obstacles to producing such a display: (1) selecting a suitable display medium capable of recording, displaying, erasing or replacing, and updating the image; (2) communications bandwidth necessary to transfer the enormous amounts of data necessary to produce an image on the display; and (3) rendering hardware and software that is fast enough to produce a real-time or quasi-real time, interactive experience.

There have been a number of efforts to develop a real-time holographic display, most notably by Steve Benton's Spatial Imaging Group at the MIT Media Laboratory, and by a group at QinetiQ, a spin-off company from the UK's Defense Evaluation and Research Agency (DERA). These efforts have produced some promising but limited results.

The MIT effort resulted in a monochrome display with dimensions of approximately 75 mm×100 mm, and exhibiting horizontal parallax only. The system is based on first computing fringe patterns using physical simulation, displaying them piecewise in an acousto-optic modulator (AOM), and then raster scanning a demagnified image of the AOM to produce a larger display. Images produced on the MIT display have approximately 30 degrees of horizontal viewzone, and the vertical resolution is limited to 144 lines. Many of the image quality tradeoffs of the MIT system reflect a need to minimize the total data bandwidth of the system. As a result, each frame of the display contains approximately 36 megabytes of information. Custom and customized hardware enable the display to be updated at up to 2 to 3 frames per second with pre-stored image information. Since the system requires complex computational physical simulation to produce holographic fringe patterns, real-time updating is difficult.

The QinetiQ approach also relies on physical simulation to produce synthetic fringe patterns. These, however, are written onto an electrically-addressed spatial light modulator (EASLM), and are demagnified and re-imaged onto an optically-addressed spatial light modulator (OASLM) for final display. The approach is potentially capable of producing full-parallax images, and is scalable through tiling multiple EASLM/OASLM units together. The system has not been publicly demonstrated to date, and thus it is difficult to assess its characteristics and effectiveness. Computational elements of the QinetiQ display have been documented, but the performance of the system has not been demonstrated.

Both the MIT and QinetiQ approaches rely on complex physical simulation to calculate holographic fringe patterns which are then downloaded to the display hardware. Light being directed through that hardware diffracts from these fringes, and reproduces wavefronts, or approximations thereof, of the desired imaged object or scene. This approach has limitations because it relies on the need for a display device with extremely high resolution that can be electronically addressed in order to enable writing of the fringe pattern. Such approaches often have limited resolution, and rely on demagnification to achieve the high resolution necessary to diffract light. Limited space-bandwidth products of such approaches in turn limit the viewing angle and resolution of the final image.

Accordingly, it is desirable to have improved systems and methods for producing updateable or active hologram displays that avoid the need for complex physical simulation to produce synthetic fringe patterns. Moreover, it is desirable that such systems and methods high resolution images that possess adequate field of view properties.

SUMMARY OF THE INVENTION

It has been discovered that certain types of holographic recording materials can be used to updateably record holographic stereograms formed when fringe patterns are generated through interference of an object laser beam containing image information with a reference laser beam. In this manner, calculation of fringe patterns is avoided, and instead perspective information is computed for a scene or object to be displayed, the information is downloaded to display hardware such as a spatial light modulator, and fringe patterns are subsequently generated through interference of an object laser beam containing this information with a reference laser beam in the classic hologram recording scheme. Previously recorded holographic stereograms or component hogels are updated by erasing the stereograms or component hogels and recording updated stereograms or component hogels, or by recording updated stereograms or component hogels in a separate portion of the holographic recording material.

Accordingly, one aspect of the present invention provides a provides an apparatus for recording and displaying holographic stereograms. The apparatus includes a light source that produces a coherent beam. A beam splitter splits the coherent beam into an object beam and a reference beam. An object beam optical system directs the object beam to interfere with the reference beam at an updateable holographic recording material. A reference beam optical system directs the reference beam to interfere with the object beam at the updateable holographic recording material. A material holder holds the updateable holographic recording material. An illumination source is oriented with respect to the updateable holographic recording material so as to illuminate at least one hogel recorded in the updateable holographic recording material for viewing by a user.

Another aspect of the present invention provides a method of recording and displaying holograms. An updateable holographic recording material is provided. A first portion of the updateable holographic recording material is exposed to a first interference pattern formed by a reference beam from a laser and an object beam from the laser. A hogel is formed in the first portion of the updateable holographic recording material corresponding to the first interference pattern formed by the reference beam from the laser and the object beam from the laser. The hogel is illuminated. A second portion of the updateable holographic recording material is exposed to a second interference pattern formed by the reference beam from the laser and the object beam from the laser. An updated hogel is formed in the second portion of the updateable holographic recording material corresponding to the second interference pattern formed by the reference beam from the laser and the object beam from the laser. The updated hogel is illuminated.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present inventions may be better understood, and their numerous objects, features, and advantages made apparent to those skilled in the art by referencing the accompanying drawings.

DETAILED DESCRIPTION

The following sets forth a detailed description of the best contemplated mode for carrying out the invention. The description is intended to be illustrative of the invention and should not be taken to be limiting.

The systems and methods described in the present invention do not rely on the calculation of fringe patterns. Instead, perspective information is computed for the scene or object, downloaded to display hardware such as an SLM, and the fringe pattern is subsequently generated through interference of an object laser beam containing this information with a reference laser beam in the classic hologram recording scheme.

While the hologram recording devices described, for example, in the '088 patent make use of both continuous wave (CW) and pulsed lasers, CW lasers can be less desirable for updateable holographic displays because they present certain limitations. Chief among those limitations is the relatively low output power of CW lasers which causes the hologram recorder to use relatively long exposure times (e.g., tens of milliseconds) for each hogel. During those exposure times, the entire hologram production system is particularly susceptible to mechanical vibration. Great effort is expended to reduce or eliminate the mechanical vibrations. Hologram recorders are typically located far away from sources of environmental vibration, such as outside traffic, building vibration, mechanical equipment, common appliances, human motion, acoustic noise, plumbing turbulence and air flow. Special devices, such as vibrationally-isolated optics tables, are typically used where environmental vibration sources cannot be sufficiently reduced or eliminated. Such devices and techniques add cost and complexity to hologram production systems. Moreover, to help ensure a stable hogel recording environment, a step-repeat approach is often adopted in translating the holographic recording medium or the recording optics with respect to the recording medium. Consequently, additional settling time (on the order of tens of milliseconds as well) is introduced into the recording process. The cumulative recording and settling times prolong the hologram production process, often making it impractical for certain applications. Moreover, the mechanical systems used to step the system, bring (or allow) the system to come to a stop, and repeat can be very complex.

Using pulsed lasers in hologram production devices can mitigate or solve many of the aforementioned problems associated with CW laser use. Due to the different physics of pulsed laser operation, a small frame pulsed laser is able to generate higher light intensity than its CW counterparts. For example, small frame frequency doubled Nd:YAG pulsed lasers can generate 1.1 mJ of energy during a 35 ns long pulse at 532 nm. This corresponds to approximately 31.4 kW of power during the pulse. In contrast, a typical CW Nd:YAG laser produces approximately 4W of power. Because high exposure intensity is possible using pulsed lasers, the required exposure time to generate a hologram can be reduced significantly. While tens of milliseconds is typically needed for CW laser hologram recording, the tens of nanoseconds pulse duration of a pulsed laser is adequate for pulsed laser hologram recording. Decreasing the exposure time by six orders of magnitude means that the frequencies of both the movement of the hologram recorder components and environmental vibration are too low to generate any noticeable effect on interference pattern generation. The mechanical stability requirements restricting the CW laser based hologram recorder are completely relaxed. Consequently, the recorder design can be significantly simplified and the cost of the hardware is reduced.

Thus, although the presently described systems and methods are not limited to the use of pulsed laser systems, the use of pulsed laser systems will be emphasized in this description. Moreover, the systems and methods described herein can make use of the devices and processes for recording holograms using pulsed lasers as described in U.S. patent application Ser. No. 10/167,759 entitled "Pulsed-Laser Systems and Methods for Producing Holographic Stereograms," naming Craig Newswanger, Pankaj Lad, Robert L. Sitton, Qiang Huang, Michael A. Klug, and Mark E. Holzbach as inventors, (the '759 application) which is hereby incorporated by reference herein in its entirety.

Figure 1:
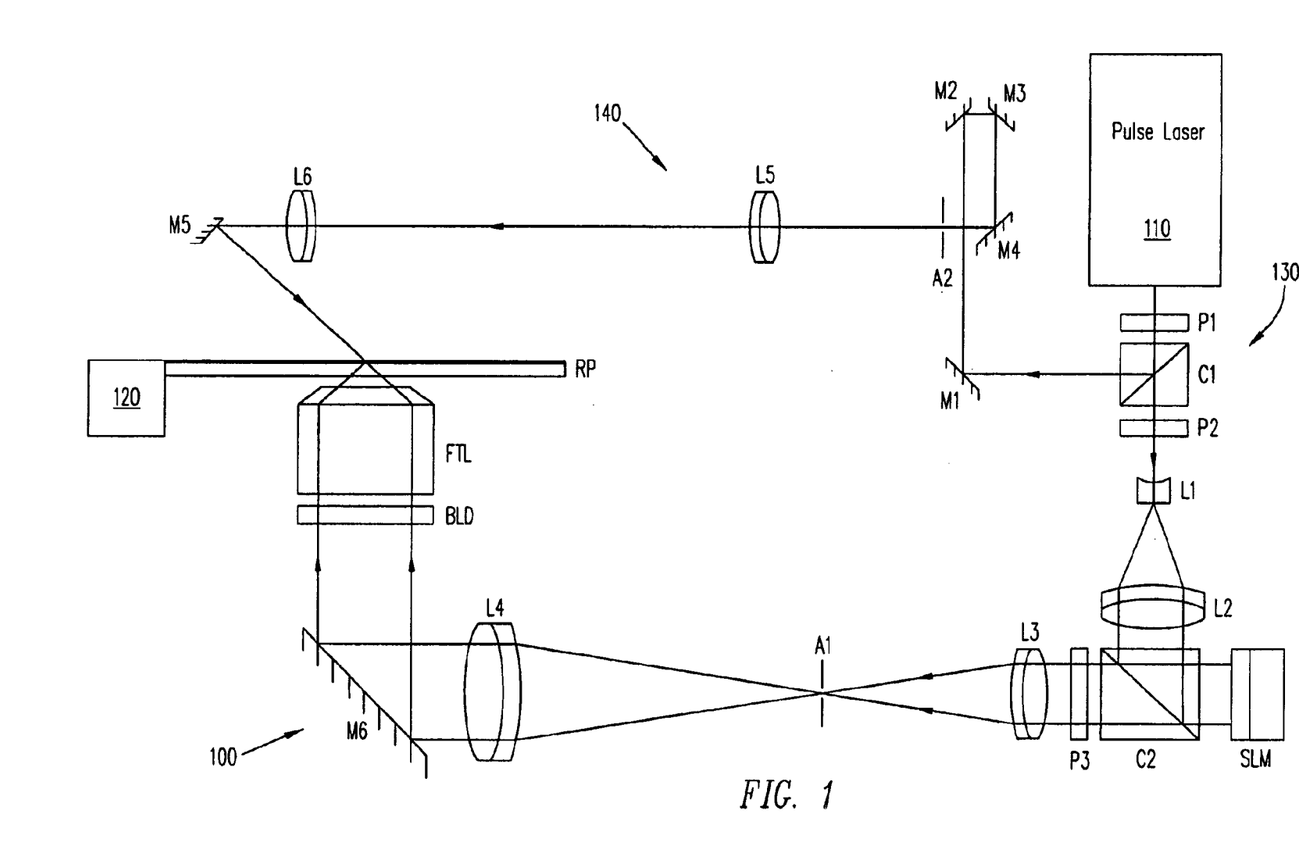
FIG. 1 is a schematic diagram a hologram production device using a pulsed laser.

FIG. 1 is a schematic diagram of a pulsed laser based hologram production device that can take advantage of the pre-sensitization and recording techniques described in the '759 application and can be used for the active digital hologram displays described herein. Hologram recorder 100 is designed to rapidly produce horizontal-parallax-only (HPO) or full parallax holograms and particularly holographic stereograms. The main components of hologram recorder 100 are pulsed laser 110, synchronized holographic recording material translating system 120, object beam optical system 130 and reference beam optical system 140. In other implementations, the recording material is kept stationary, and object beam optical system 130 and reference beam optical system 140 are translated with respect to the recording material. In still another implementation, object beam optical system 130 and reference beam optical system 140 are combined together so that only one optical system need be translated.

Although hologram recorder 100 is shown having only one pulsed laser, hologram recorder 100 can in general be constructed with several different pulsed lasers (or one pulsed laser capable of providing laser output at multiple wavelengths) to enable recording of multi-color holograms and holographic stereograms. Thus, the systems and methods described in the aforementioned '088 patent can be extended to the use of pulsed laser hologram recorders such as recorder 100.

An example of a pulsed laser 110 that can be used in hologram recorder 100 is the 212 Series (e.g., model 212S-532-3500) diode-pumped, Q-switched pulsed Nd:YAG laser manufactured by Lightwave Electronics Corporation of Mountain View, Calif. Those having ordinary skill in the art will readily recognize that a variety of different pulsed lasers can be used in hologram recorder 100. In general, the laser wavelength, laser pulse power, and laser pulse energy of a particular pulsed laser system are the determining factors for use in a hologram recorder.

For multiple color, e.g., red-green-blue (RGB), laser pulses, a variety of different laser systems can be used including diode-pumped solid state lasers, flash-lamp pumped solid state lasers, and dye lasers. Typical solid-state laser gain media include ruby, sapphire, garnet, alexandrite, Titanium sapphire (Ti:sapphire), Neodimium:Yttrium Aluminum Garnet (Nd:YAG), and Neodimium:Yttrium Lithium Fluoride (Nd:YLF). In one example, optical parametric oscillators (OPOs) are used to down convert laser frequency. For example, a frequency tripled Nd:YAG laser can produce 355 nm pulses which in turn drive a tunable OPO to produce pulses ranging from 410 nm to 690 nm. In another example, a Nd:YLF laser produces 1047 nm pulses which are then converted through second-harmonic generation to 523 nm pulses used to drive an OPO. Output from the OPO at 898 nm and 1256 nm can be frequency doubled through second harmonic generation to yield 449 nm and 628 nm pulses respectively. In another example, Raman converters can be utilized. The output of a pulsed alexandrite laser (e.g., 764 nm pulses) is frequency doubled through second harmonic generation to yield 382 nm pulses. These pulses then pass through a Raman cell including Deuterium Hydride (HD) gas. Careful selection of the input pulse can yield, for example, output laser pulse of 443 nm, 527 nm, and 650 nm. Other types of pump lasers, e.g., Nd:YAG and Nd:YLF, and other gases for the Raman cell, e.g., Deuterium ($D_2$) or methane ($CH_4$), can be used. Moreover, some combination of all or some of these techniques and lasers can be used to produce the desired pulse wavelengths.

The pulsed laser beam produced by pulsed laser 110 is split into object and reference beams by the beam splitter C1, typically a polarizing beamsplitter cube. The polarizations and relative intensities of the object and reference beams (i.e., the beam ratio) are controlled by retarders P1 and P2, typically half-wave plates.

The object beam is then expanded and collimated by a collimator formed through the combination of lenses L1 and L2. Next, the object beam is reflected by beamsplitter cube C2 into spatial light modulator (SLM) SLM where the object beam wavefront is intensity modulated. Spatial light modulator SLM as illustrated is a reflective SLM which rotates the polarization state of the object beam. In general, a variety of different SLMs can be used including, but not limited to, a transmissive LCD panel, a reflective LCD panel, an optically addressed LCD panel, a digital micro-mirror array, film, or a transparency. The SLM typically receives image input via a video cable from a computer system (not shown). Additionally, multiple SLMs can be used having images generated in parallel by multiple central processing units or computer systems. Thus, the response time of the SLM is typically an important parameter. Examples of SLMs for use in hologram recorder 100 include the Digital Direct Drive Image Light Amplifier (D-ILA®) series of reflective LCD devices manufactured by the Victor Company of Japan, Ltd. (JVC). Additionally, a single multiple color SLM can be used, or multiple SLMs can be used (typically one SLM for each beam color). The images displayed on the SLM, and thus the images used to intensity modulate the object beam, are typically computer graphics images (either rendered or converted images of real objects) designed and/or processed for recording as holograms.

The modulated wavefront is relayed and filtered by the lens pair L3 and L4 and aperture A1 to then form an image on a band-limited diffuser or an anisotropic diffuser BLD. Note that, in general, the diffuser can be located in a variety of different positions throughout the system. The image then passes through a Fourier transform lens FTL thereby generating the desired object beam wave front at the holographic recording material positioned on recording plate RP. Note that although hologram recorder 100 is shown using lens pair L3 and L4, to, for example, remove undesired effects such as, but not limited to, high frequency image components such as pixel or grid artifacts that resulted from an SLM display with pixels, a variety of different optical systems can be used.

In reference beam optical system 140, the reference beam is transmitted through path length matching optics (mirrors M1, M2, M3, and M4) and illuminates the reference beam-shaping aperture A2. Path length matching optics are used to adjust the path length of the reference beam path to match that of the object beam, or to at least bring the two paths within a distance of each other that is less than or equal to the coherence length of pulsed laser 110. For some pulsed lasers, the coherence length can be on the order of several millimeters. The image of shaping aperture A2 is then relayed via reference beam relay optics L5 and L6 to the holographic recording material at recording plate RP. As shown, the angle of incidence of the reference beam with respect to the surface normal of the holographic recording material at recording plate RP is preferably oblique, and further preferably approximates 45°. In other examples, the angle of incidence of the reference beam with respect to the surface normal of the holographic recording material is approximately 0°. A variety of different techniques can be used steer either or both of the reference beam and the object beam. For example, the devices and techniques of the aforementioned '088 patent can be utilized. Finally, the object and reference beams are superimposed at the holographic recording material on recording plate RP producing the interference pattern required for hologram (or hogel) recording.

In the example of FIG. 1, the optics systems 130 and 140 are generally kept stationary during the operation of hologram recorder 100 while the synchronized holographic recording material translating system 120 is used to reposition the holographic film located at recording plate RP for each hogel that is recorded. Synchronized holographic recording material translating system 120 is typically a computer controlled x-y translation system. In one example, synchronized holographic recording material translating system 120 includes a 300AT series positioning system manufactured by the Daedal Division (Irwin, Pa.) of the Parker Hannifin Corporation and an ACR2000 position controller manufactured by Acroloop Motion Control Systems, Inc., of Chaska, Minn. In systems where the holographic recording material is kept stationary, similar devices and techniques can be used to translate object beam optical system 130 and reference beam optical system 140 with respect to the recording material. Moreover, devices and techniques for synchronizing device translation, SLM computer graphics image display, and laser pulsing are described in greater detail in the aforementioned '759 application.

It should be noted that it is well within the skill of one having ordinary skill in the art to substitute different optical components for many of the specific optical components shown in FIG. 1. For example, a variety of different polarizing devices, beam splitters, collimating optics, lenses, SLMs and mirrors can be used in hologram recorder 100. Additionally, although FIG. 1 illustrates a system for producing reflection holograms, systems for producing transmission holograms using the devices and techniques described above can also be implemented.

The basis unit for the digital hologram displays described herein is the holographic element, or "hogel". Each hogel is capable of storing the intensity and direction for millions of light rays, as distributed by angular orientation. A hogel is formed through the interference of a transformed beam of light with a (usually collimated) reference beam. In the simplest form, the transform would be a Fourier transform of a greyscale mask or image, accomplished via the placement of the mask at the back focal plane of a lens. As described in the '088 patent, introduction of a digital optical element is typically coincident with the mask that produces band-limited diffusion of the focused beam at the transform plane. This element can be used to create a diffuse spot of light of any desired shape or size. A reference beam, typically composed of a non-diffuse, but nominally planar wavefront, may be introduced into the diffuse spot from any direction in order to form the hogel interference pattern. The hogel is an interference pattern that can reproduce the specific angles and intensities of the data beam when illuminated with a replica of the reference beam or the phase conjugate of the reference beam. Thus, the data beam contains the perspective, intensity, and possibly also the phase information for the hogel area on the hologram plane, and that information is encoded through interference with the reference beam. As either the film or the optics are indexed (e.g., translated), an array of hogels is recorded or "written" in the medium through successive interference with the reference beam. The reference beam angle may change for each hogel so that the final array may be illuminated with a variety of different light sources including diverging point sources or a converging beam, if desired, without distortion of the image. This also enables a single point source illumination beam to substantially fulfill the Bragg condition for each hogel on replay.

Figure 2A:
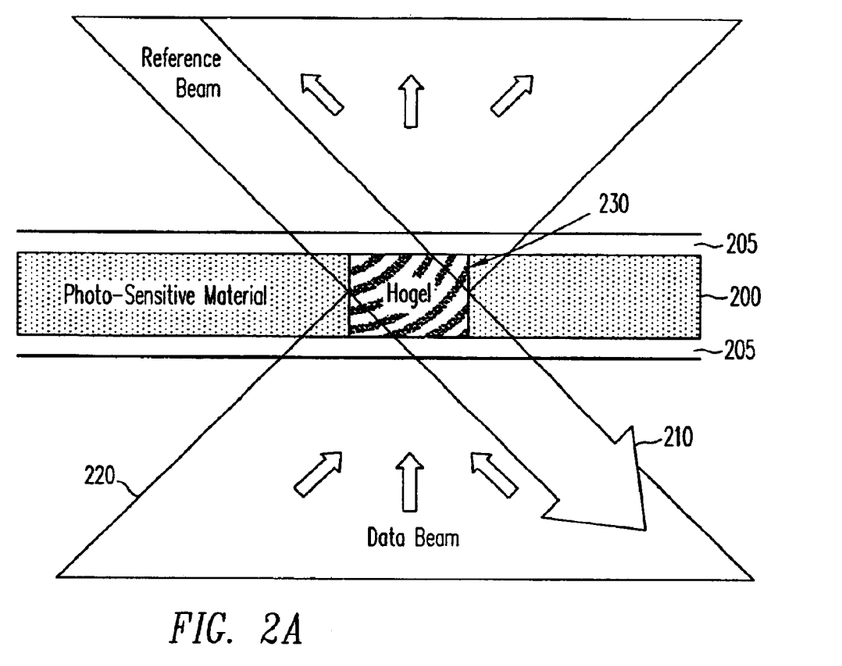
FIGS. 2A–2B illustrate several different schemes for recording holograms using devices such as the device shown in FIG. 1.
Figure 2B:
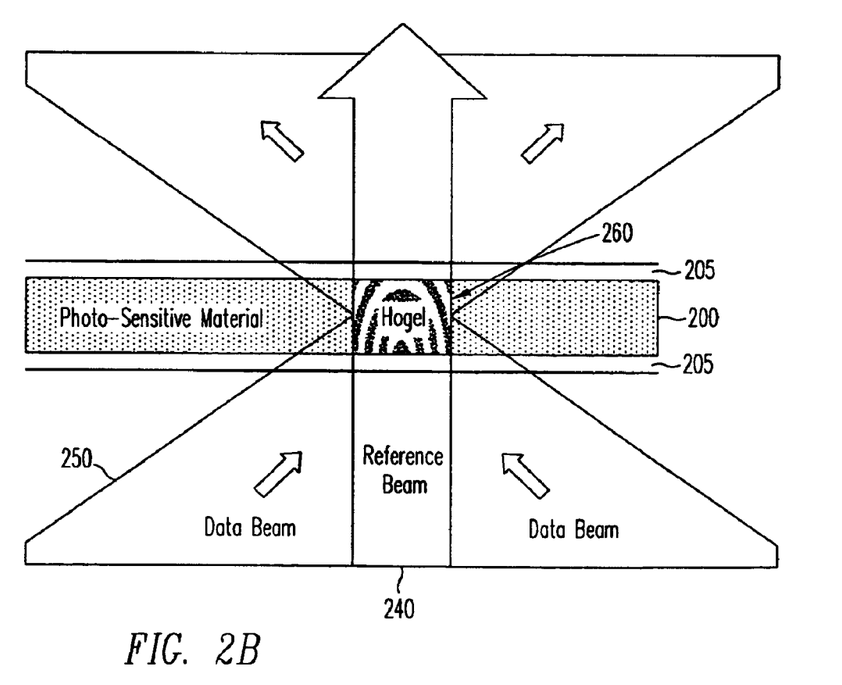

FIGS. 2A and 2B illustrate two potential configurations of this arrangement, but a nearly infinite combination angles, orientations, and wavefronts is possible. FIG. 2A illustrates a "reflection" off-access recording configuration. In this example, the data (object) beam 220 illuminates holographic recording material 200 (typically presented on a substrate 205 or between two substrates 205 as shown) from one side while reference beam 210 illuminates holographic recording material 200 from the opposite side. With many systems, the angle of incidence of the reference beam can be arbitrarily selected depending on desired image playback conditions. Because reference beam 210 and data beam 220 are coherent, their intersection forms an interference pattern which is recorded in material 200 as hogel 230.

FIG. 2B illustrates a "transmission" on-access recording configuration. In this example, the data (object) beam 250 illuminates holographic recording material 200 from one side while reference beam 240 illuminates holographic recording material 200 from the same side. As is the case for reference beam 210, many systems allow the angle of incidence of the reference beam to be arbitrarily selected depending on desired image playback conditions. Again, because reference beam 240 and data beam 250 are coherent, their intersection forms an interference pattern which is recorded in material 200 as hogel 260. Once a hogel is stored in the recording material, re-illumination with a beam from the same or opposite direction as the reference beam results in a reconstruction of the data beam light rays.

The updateable or active digital holographic displays described in connection with FIGS. 3A–5 are based on the concept of temporarily storing the hogel interference pattern in a medium that can be erased by some means or that has a natural decay such that the interference pattern is not permanently recorded in the medium. In addition to the mechanism for recording the hogels, there is also some mechanism for simultaneously or contemporaneously replaying the data beam from the hogel. One such configuration is illustrated in FIGS. 4A and 4B. In this example, an off-axis transmission hogel is formed in a rewritable material 400 (typically associated with one or more substrates 405) using a first wavelength laser to produce reference beam 420 and data beam 430. During the recording step, data beam 430 and reference beam 420 both pass through a static volumetric holographic reflector 410 that does not affect or divert light of the first wavelength, i.e., the wavelength of the data and reference beams. Devices such as static volumetric holographic reflector 410 can be fabricated using conventional holographic optical element techniques as is well known in the art. Hogel 440 is recorded in rewritable material 400.

Figure 4A:
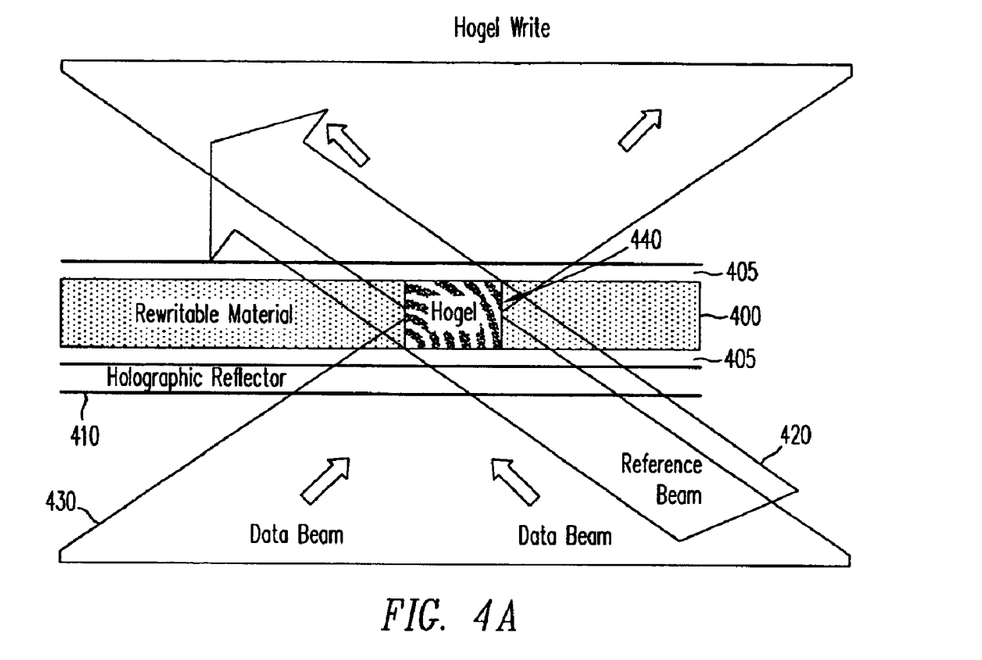
FIGS. 4A–4B illustrate schemes for recording ("writing") and replaying or displaying updateable holograms.
Figure 4B:
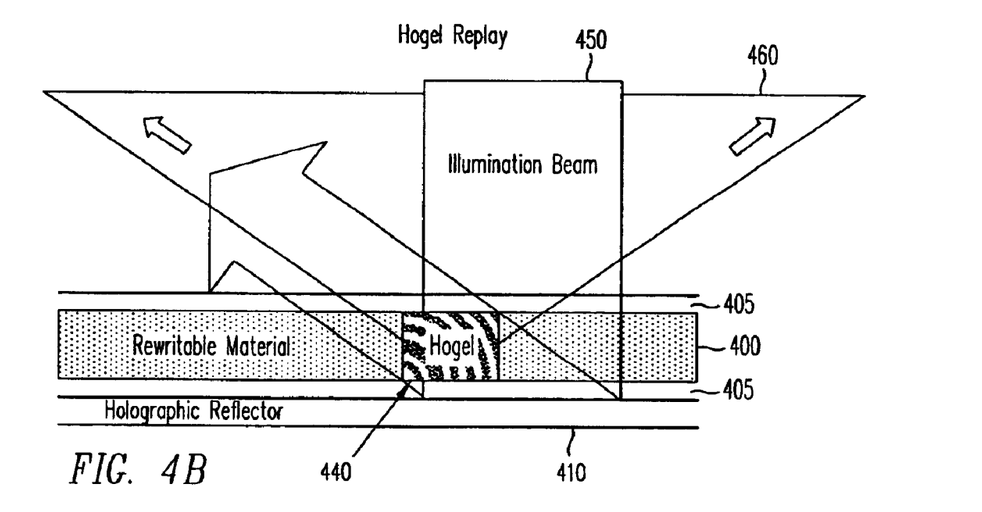

Hogel 400 can be replayed when an illumination beam 450 formed from light of a second wavelength different from the first wavelength is directed through the hogel, and reflected off the holographic reflector 410 (which is designed to reflect light of the second wavelength in a particular manner). Once reflected off holographic reflector 410, illumination beam 450 subsequently passes through hogel 440 at the proper reconstruction angle. Thus, hogels can be written by the beams of the first wavelength and simultaneously or contemporaneously diffract an illumination beam of a second wavelength, thereby reproducing the data beam 460 for viewing. Although FIG. 4B illustrates illumination beam 450 as normally incident on rewritable material 400 and holographic filter 410, this need not be the case. In general, holographic filter 410 can be designed to produce a reflected illumination beam using any angle of incidence including angles at or close to 90 degrees, e.g., an edge-lit condition. Moreover, holographic filter 410 can be designed to incorporate other features such as color filter elements, e.g., separate red, green, and blue filter elements to filter light in a desired fashion.

Figure 3A:
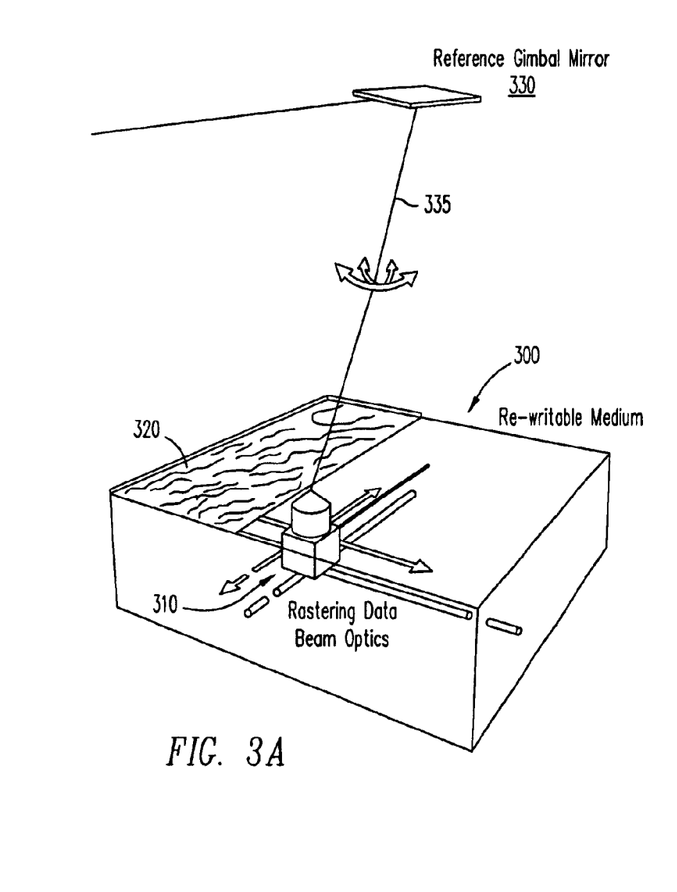
FIGS. 3A–3B illustrate an devices for recording and displaying ("playing back") updateable holograms.

In an embodiment illustrated in FIG. 3A, a pulse laser is used for recording hogels in a rewritable medium 300 that can be erased with, for example, an applied voltage, applied thermal energy, or an applied light source, or which may self-erase through a natural decay process whereby a recorded interference pattern is eventually lost. The display is presented as a horizontal "table", with reference beam 335 directed to recording medium 300 by a pivot mirror 330 above the table. The reference beam is scanned with a galvanometric gimbal system such as those described in the aforementioned '088 patent, and the beam intersecting medium 300 is tracked by the data beam optics 310 on the opposite side of recording material 300, which scan in step with the reference beam raster motion. Operation of the device yields a digital hologram 320 formed from an array of hogels. As previously noted, pulsed lasers can be used so as to enable continuous motion and simultaneous freezing of the fringe pattern in the recording medium.

Figure 3B:
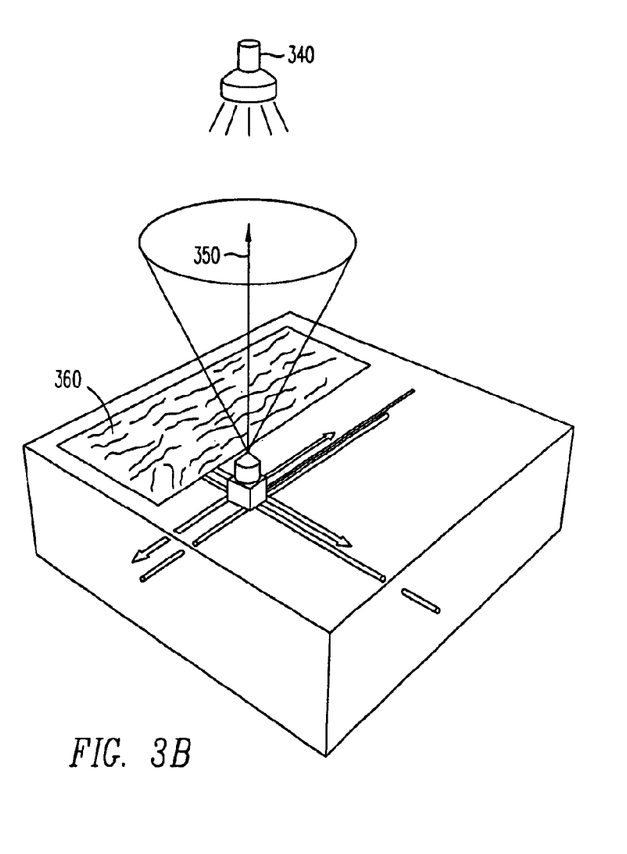

Illumination of the updateable display is shown in FIG. 3B. For example, an illumination source 340 is placed close to the reference beam pivot mirror point to illuminate the recorded hogel array 320. The illumination wavelength may be a different than the recording wavelength to prevent desensitization or bleaching of the recording medium by the illumination source. Moreover, recording medium 300 can have the ability to shift the reflected frequency of the hologram by changing thickness dynamically, or through some other mechanism. Proper illumination of hogel array 320 yields a displayed holographic image 360. In general, illumination source 340 can be provided by a scanned or diverged laser beam, an LED, a halogen lamp, or some other light source. In another illumination example illustrated in FIG. 3B, hogel arrays recording in the on-axis transmission configuration of FIG. 2B can be illuminated by a light source, perhaps interleaved with the light sources used for recording, presented from underneath hogel array 320.

Figure 5:
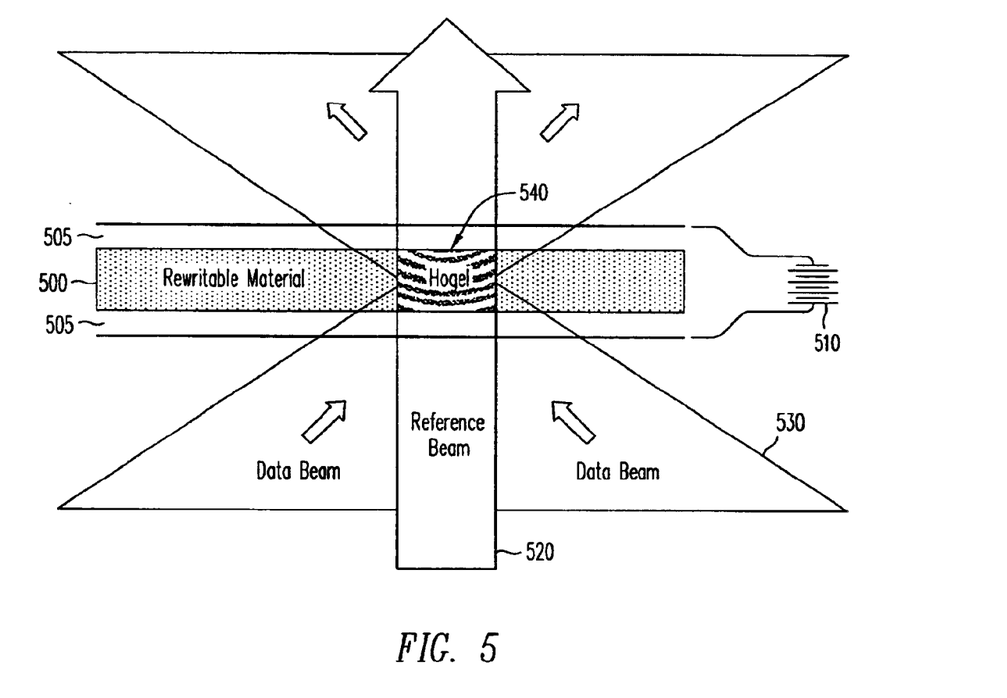
FIG. 5 illustrates another device and scheme for recording updateable holograms.

Since the type of rewritable recording material used will generally dictate the techniques needed to "erase" a previously recorded hogel, a variety of different embodiments for the recording system shown in FIG. 3A are envisioned. FIG. 5 illustrates such an example. As with FIG. 2B, FIG. 5 illustrates an on-access transmission recording scheme. Data beam 530 illuminates holographic rewritable recording material 500 from one side while reference beam 520 illuminates the recording material from the same side, to form hogel 540. However, in this example the rewritable recording material can be erased by applying a specified voltage across the material. Such a feature is common to many photorefractive materials. Consequently, substrates 505 include transparent conductive electrodes coupled to voltage source 510. The electrodes that are part of substrates 505 allow the erasing voltage to be delivered to the rewritable recording material. Depending on the type of material and the type of the electrodes, implementations can be designed with addressable electrodes that correspond to areas where hogels are recorded. Consequently, individual hogels can be erased as needed, e.g., immediately before they are to be re-written. The electrodes are typically implemented using transparent or semi-transparent materials so as to minimize their effect on light transmission through the substrates 505. Although illustrated in connection with an on-access transmission recording scheme, the erasing system shown in FIG. 5 can be used with a variety of different recording schemes.

Figure 6A:
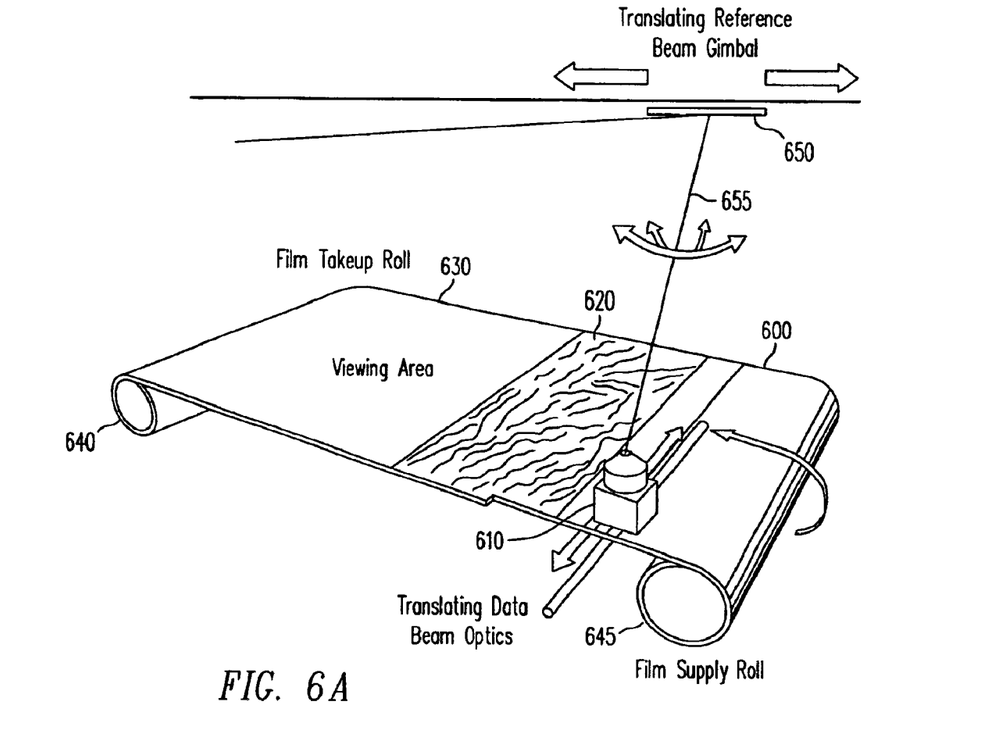
FIGS. 6A–6B illustrate several examples of other devices for recording and displaying updateable holograms.
Figure 6B:
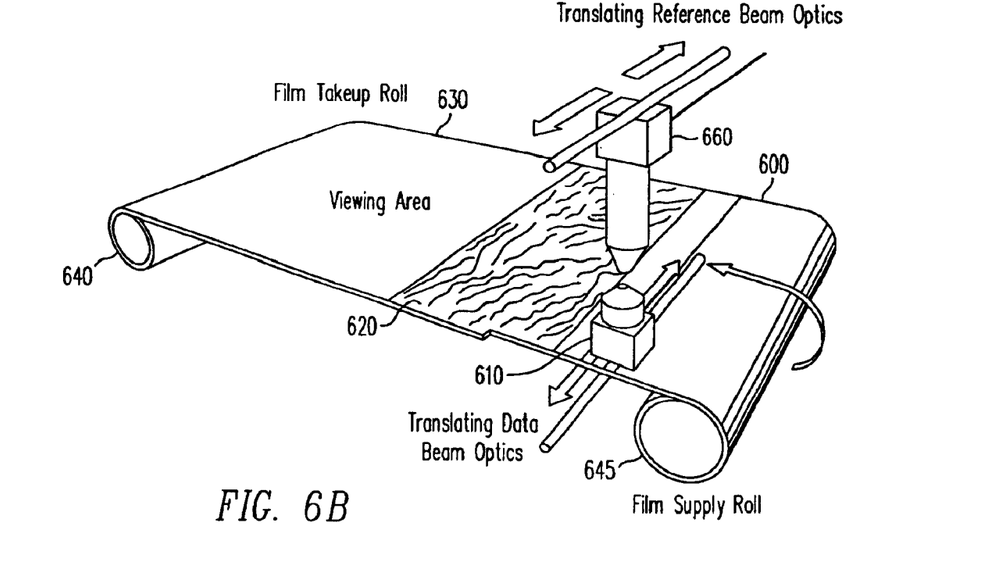

FIGS. 6A and 6B illustrate still other embodiments of active digital hologram displays. In these examples, the holographic recording material cannot be effectively erased and reused, but the display is still active and updateable because the recording material is replaced by an automated means. In these examples, the recording material 600 is supplied by a film supply roll 645 and taken up by film take-up roll 640. In a typical implementation, these film rolls are motorized and synchronized with the recording optics. The rolls can advance recording material 600 after each frame is completely written or as a new frame is demanded by the user. A recorded array of hogels 620 is produced using any of the above described techniques. As shown in FIG. 6A, data beam optics 610 are configured to be translated or scanned across the width of the film roll. Reference beam 655 is directed to recording medium 620 by a pivot mirror 650 above the film. The reference beam is scanned with a galvonometric gimbal system such as those described in the aforementioned '088 patent, and the beam intersecting medium 620 is tracked by the data beam optics 610 on the opposite side of recording material 620, which scan in step with the reference beam raster motion. In a variation on this implementation, pivot mirror 650 is further configured to be translated along the length of the film roll. This might be so that the angle of incidence of the reference beam can be further varied, or to better accommodate similar translation of data beam optics 610. After recording, a portion of recording material 600 is translated to viewing area 630 which is generally away from the recording area. Further devices (not shown) for proper illumination of the recorded hogel array may be situated with respect to the viewing area.

Similarly, FIG. 6B illustrates an alternate arrangement. In this example, reference beam optics 660 are designed to be translated in a manner like data beam optics 610. Thus, data beam optics 610 and reference beam optics 660 are located directly opposite each other on either side of recording material 600. This configuration might provide a more compact design. Additionally, translation of the two sets optics can be coordinated using the same control signals and potentially the same translation devices.

Recording materials used for these types of devices preferably require little or no film processing. Processing techniques that might need to be accommodated included: heating, UV illumination, film pre-sensitization, chemical processing or the like. Devices to provide requisite processing can be incorporated into an exposure head, or implemented separately. Consequently, the processing can take place as the film is advancing before and/or after hogels are recorded. Other devices such as masking plates and shrouds (not shown) may also be used to protect unexposed film from illumination and recording sources.

A variety of different types of holographic recording material can be used with the techniques discussed herein. One example of the type of recording materials that can be used, particularly for the devices described in connection with FIGS. 6A and 6B, is photopolymerizable compositions (photopolymers) because of their image recording capabilities and their relative ease of use. Photopolymers include a wide range of materials that undergo physical, chemical, or optical changes through selective polymerization when exposed to light. Typically, photopolymers include a monomer or a crosslinkable polymer, a sensitizer or photoinitiator, and a binder or liquid to hold the components. Changes in the photopolymer's refractive index, transparency, adhesion, and/or solubility differentiate light and dark regions when these materials are exposed to an activating light source. Photopolymers capable of recording volume phase holograms include those developed by Canon Incorporated (based on polyvinyl carbazole), Polaroid Corporation (based on polyethylene amine/acrylate), Daiso Co. Ltd., and E.I. du Pont de Nemours and Company (based on polyvinyl acetate and polymethyl methacrylate). Those having ordinary skill in the art will readily recognize that a variety of different photopolymer compositions can be used in the practice of the inventions described herein. Nevertheless, preferred photopolymer films are provided by E.I. du Pont de Nemours and Company under the trade designations, for example, OmniDex™ 706, OmniDex™ 801, HRF-800X001-15, HRF-750X, HRF-700X, HRF-600X, and the like.

More specialized photopolymer systems can be used for the rewritable materials of the present systems, such as the polymer systems using two independently polymerizable chemical systems (low-refractive index matrix precursors and high-refractive index photopolymerizable monomers) developed for holographic storage by InPhase Technologies.

Other useful holographic recording materials, particular for rewritable applications, include traditional photorefractive materials such as bismuth silicon oxide ($Bi_{12}SiO_{20}$), lithium niobate ($LiNbO_3$), barium titanate ($BaTiO_3$), cadmiun sulfide (CdS), gallium arsenide (GaAs) and indium phosphide (InP). Many of these materials possess good photorefractive properties while also exhibiting some mechanism, e.g., natural decay of the recorded interference pattern, electrical/thermal/optical reversibility, etc., whereby a recorded hogel can be erased. Although these materials are often used in bulk form, some embodiments of the present invention can utilize thin film structures based on these materials. In still other examples, stratified media possessing alternating photorefractively active and inactive layers can be used.

Still other media for use in the above described rewritable applications, classes of chalcogenide compounds, thermally-deformable materials, liquid crystals, polymer-dispersed liquid crystals, and specialized devices such as optically addresses SLMs.

For example, optical phase-change materials based on chalcogenide compounds (chalcogens are the Group 16 elements: oxygen (O), sulphur (S), selenium Se), tellurium (Te), and polonium (Po)) are capable of being switched from one detectable state to another detectable state or states by the application of optical energy. The state of the phase-change changeable material is detectable by properties such as, for example, index of refraction, optical absorption, optical reflectivity, or combinations thereof. For example, Tellurium based materials have been utilized as phase-change materials for data storage applications where the change in the material is evidenced by a change in a physical property such as reflectivity. Generally, a laser is used to supply the optical energy to cause the phase transitions between amorphous and crystalline states in these types of optical phase-change materials. The amount of energy applied to the material is a function of both the power of the laser as well as the period of time that the laser pulse is applied. Consequently, applied laser pulses can be used to record or erase previously recorded interference patterns depending on the pulse energy.

Polymer-dispersed liquid crystal media are typically formed by sandwiching a mixture of liquid crystals and a photopolymerizable material between two substrates. Diffraction patterns formed, e.g., when forming a hogel, within the polymer-dispersed liquid crystal medium lead to the formation of strongly and weakly illuminated regions that correspond to the pattern. Photopolymers in the strongly illuminated regions polymerize while liquid crystal droplets are formed in the weekly illuminated regions. As a result, a diffraction patterns are recorded in the medium. However, these patterns optical properties can still be manipulated by manipulating the liquid crystal material, e.g., by applying a voltage.

Those having ordinary skill in the art will readily recognize that a variety of different types of optical components and materials can be used in place of the components and materials discussed above. Moreover, the description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. An apparatus for recording and displaying holographic stereograms comprising:
    a light source that produces a coherent beam;
    a beam splitter that splits the coherent beam into an object beam and a reference beam;
    an object beam optical system for directing the object beam to interfere with the reference beam at an updateable holographic recording material;
    a reference beam optical system for directing the reference beam to interfere with the object beam at the updateable holographic recording material;
    a material holder holding the updateable holographic recording material, wherein
    the material holder includes:
    a material supply portion; and
    a material take-up portion, wherein the updateable holographic recording material further comprises a flexible film disposed on the material supply and material take-up portions; and
    an illumination source oriented with respect to the updateable holographic recording material so as to illuminate at least one hogel recorded in the updateable holographic recording material for viewing by a user.

2. The apparatus of claim 1 wherein the updateable holographic recording material further comprises at least one hogel region, wherein the at least one hogel region is operable to store the at least one hogel and substantially erase the at least one hogel so that at least another hogel can be stored in the at least one hogel region.

3. The apparatus of claim 2 wherein at least one of a voltage source, a heat source, the light source that produces a coherent beam, and a second light source is used to substantially erase the at least one hogel so that at least another hogel can be stored in the at least one hogel region.

4. The apparatus of claim 2 wherein the at least one hogel region is operable to substantially erase the at least one hogel using a natural decay property of the updateable holographic recording material.

5. The apparatus of claim 1 wherein the updateable holographic recording material comprises at least one of a photopolymer, a photorefractive material, a chalcogenide compounds, a thermally-deformable material, a liquid crystal material, polymer-dispersed liquid crystal material, and an optically addressable spatial light modulator.

6. The apparatus of claim 1 wherein the updateable holographic recording material further comprises:
a first hogel region, wherein the first hogel region is operable to store the at least one hogel; and
a second hogel region wherein the second hogel region is operable to store an updated version of the at least one hogel.

7. The apparatus of claim 1 wherein the updateable holographic recording material further comprises at least one substrate coupled to the updateable holographic recording material.

8. The apparatus of claim 1 wherein the object beam optical system includes a spatial light modulator for intensity modulating the object beam.

9. The apparatus of claim 8 further comprising:
a computer coupled to the spatial light modulator and programmed to control delivery of a rendered image to the spatial light modulator.

10. The apparatus of claim 1 further comprising:
an object beam optical system translation system operable to position the object beam optical system with respect to the updateable holographic recording material.

11. The apparatus of claim 1 further comprising:
a reference beam optical system translation system operable to position the reference beam optical system with respect to the updateable holographic recording material.

12. The apparatus of claim 1 wherein the light source that produces a coherent beam is a pulsed laser.

13. An apparatus for recording and displaying holographic stereograms comprising:
a light source that produces a coherent beam;
a beam splitter that splits the coherent beam into an object beam and a reference beam;
an object beam optical system for directing the object beam to interfere with the reference beam at an updateable holographic recording material, wherein the updateable holographic recording material further comprises at least one substrate coupled to the updateable holographic recording material;
a reference beam optical system for directing the reference beam to interfere with the object beam at the updateable holographic recording material;
a material holder holding the updateable holographic recording material; and
an illumination source oriented with respect to the updateable holographic recording material so as to illuminate at least one hogel recorded in the updateable holographic recording material for viewing by a user.

14. The apparatus of claim 13 wherein the updateable holographic recording material further comprises at least one hogel region, wherein the at least one hogel region is operable to store the at least one hogel and substantially erase the at least one hogel so that at least another hogel can be stored in the at least one hogel region.

15. The apparatus of claim 14 wherein at least one of a voltage source, a heat source, the light source that produces a coherent beam, and a second light source is used to substantially erase the at least one hogel so that at least another hogel can be stored in the at least one hogel region.

16. The apparatus of claim 14 wherein the at least one hogel region is operable to substantially erase the at least one hogel using a natural decay property of the updateable holographic recording material.

17. The apparatus of claim 13 wherein the updateable holographic recording material comprises at least one of a photopolymer, a photorefractive material, a chalcogenide compounds, a thermally-deformable material, a liquid crystal material, polymer-dispersed liquid crystal material, and an optically addressable spatial light modulator.

18. The apparatus of claim 13 wherein the material holder further comprises:
a material supply portion; and
a material take-up portion, wherein the updateable holographic recording material further comprises a flexible film disposed on the material supply and material take-up portions.

19. The apparatus of claim 13 wherein the updateable holographic recording material further comprises:
a first hogel region, wherein the first hogel region is operable to store the at least one hogel; and
a second hogel region wherein the second hogel region is operable to store an updated version of the at least one hogel.

20. The apparatus of claim 13 wherein the at least one substrate coupled to the updateable holographic recording material includes at least one electrode.

21. The apparatus of claim 13 wherein the object beam optical system includes a spatial light modulator for intensity modulating the object beam.

22. The apparatus of claim 21 further comprising:
a computer coupled to the spatial light modulator and programmed to control delivery of a rendered image to the spatial light modulator.

23. The apparatus of claim 13 further comprising:
an object beam optical system translation system operable to position the object beam optical system with respect to the updateable holographic recording material.

24. The apparatus of claim 13 further comprising:
a reference beam optical system translation system operable to position the reference beam optical system with respect to the updateable holographic recording material.

25. The apparatus of claim 13 wherein the light source that produces a coherent beam is a pulsed laser.

* * * * *